(No Model.) 3 Sheets—Sheet 1.
O. KRELL.
APPARATUS FOR THE TRANSMISSION OF POWER.
No. 421,587. Patented Feb. 18, 1890.
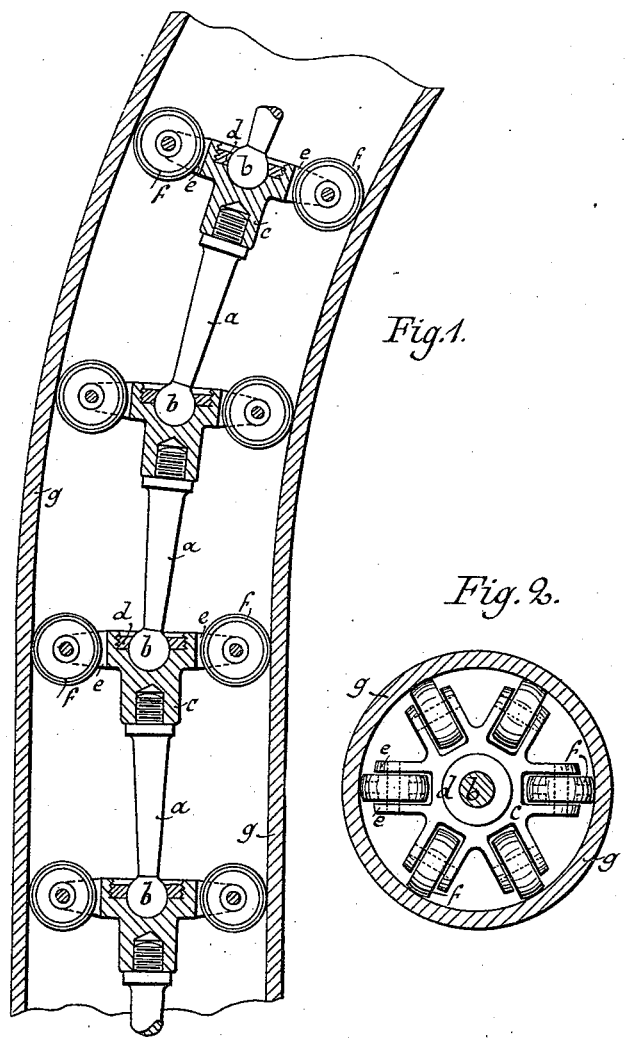
WITNESSES:
INVENTOR
Otto Krell
BY Herbert W. T. Jenner
ATTORNEY (No Model.) 3 Sheets—Sheet 2.
O. KRELL.
APPARATUS FOR THE TRANSMISSION OF POWER.
No. 421,587. Patented Feb. 18, 1890.
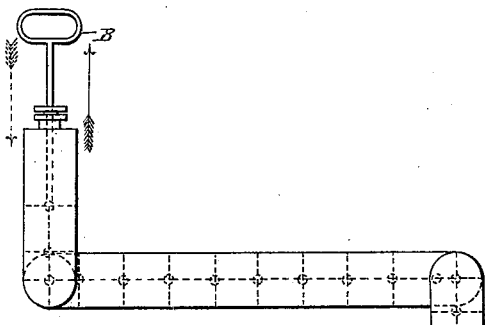
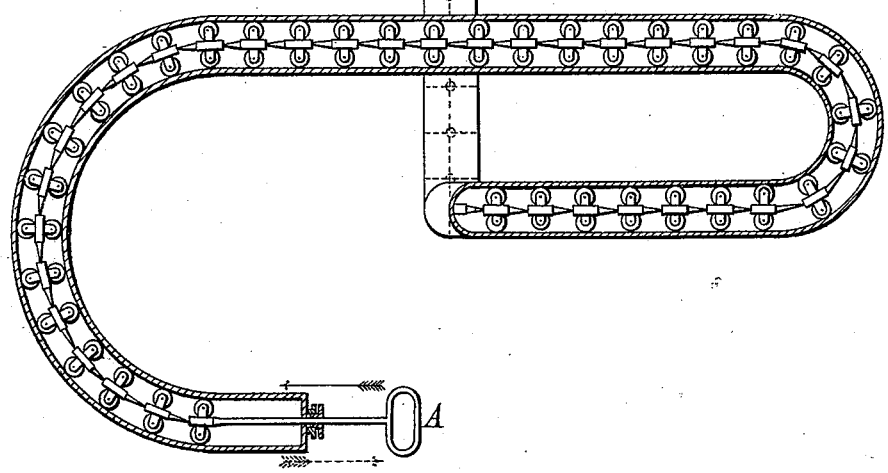
Fig. 3.
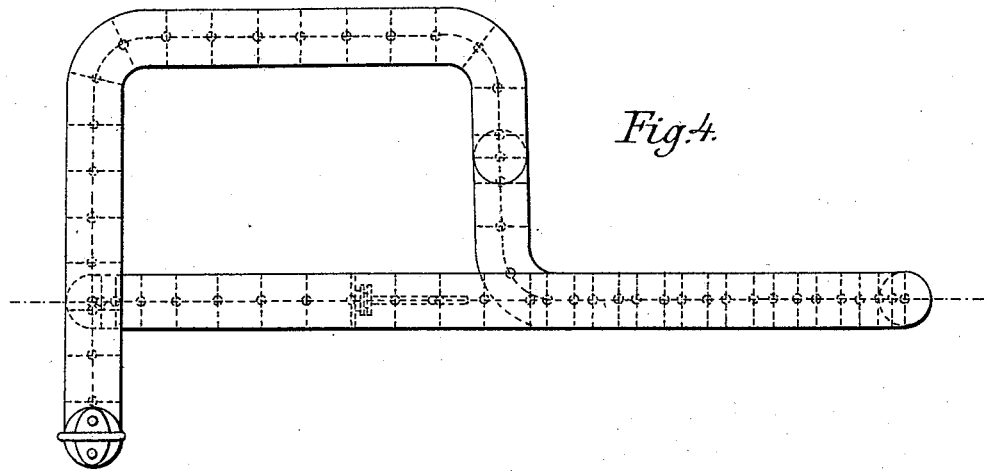
Fig. 4.
WITNESSES:
C. T. Belt
Jas. K. McCathran
INVENTOR
Otto Krell
BY
Herbert W. T. Jenner.
ATTORNEY (No Model.) 3 Sheets—Sheet 3.

O. KRELL.
APPARATUS FOR THE TRANSMISSION OF POWER.

No. 421,587. Patented Feb. 18, 1890.

WITNESSES:
C. J. Bell
Geo. L. Wheelock

INVENTOR
Otto Krell
BY
Herbert W. T. Jenner.
ATTORNEY

UNITED STATES PATENT OFFICE.

OTTO KRELL, OF ST. PETERSBURG, RUSSIA.

APPARATUS FOR TRANSMISSION OF POWER.

SPECIFICATION forming part of Letters Patent No. 421,587, dated February 18, 1890.

Application filed November 2, 1889. Serial No. 329,026. (No model.) Patented in Germany August 23, 1888, No. 46,410, and April 29, 1889, No. 49,388, and in England September 3, 1888, No. 12,705.

*To all whom it may concern:*

Be it known that I, OTTO KRELL, a subject of the Duke of Saxe-Meiningen, residing at St. Petersburg, in the Empire of Russia, have invented certain new and useful Improvements in Apparatus for the Transmission of Power, (for which foreign patents have been obtained for this invention as follows: in Germany, No. 46,410, dated August 23, 1888, and No. 49,388, dated April 29, 1889, and in Great Britain, No. 12,705, dated September 3, 1888;) and I do hereby declare the following to be a full, clear, and exact description of the invention, such as will enable others skilled in the art to which it appertains to make and use the same.

The present invention relates to an apparatus for the transmission of power either by compression or tension in any desired direction in the same or in different planes.

To this end the apparatus consists of a series of flexible jointed links, which are guided in a tube, which may be curved or coiled, so that the power may be transmitted in any desired direction.

As the apparatus is to be used for the transmission of power either by compression or tension, the transmitting part is not only in the form of a chain, but also in the form of a flexible rod, and must therefore be guided in a tube.

Figure 5:
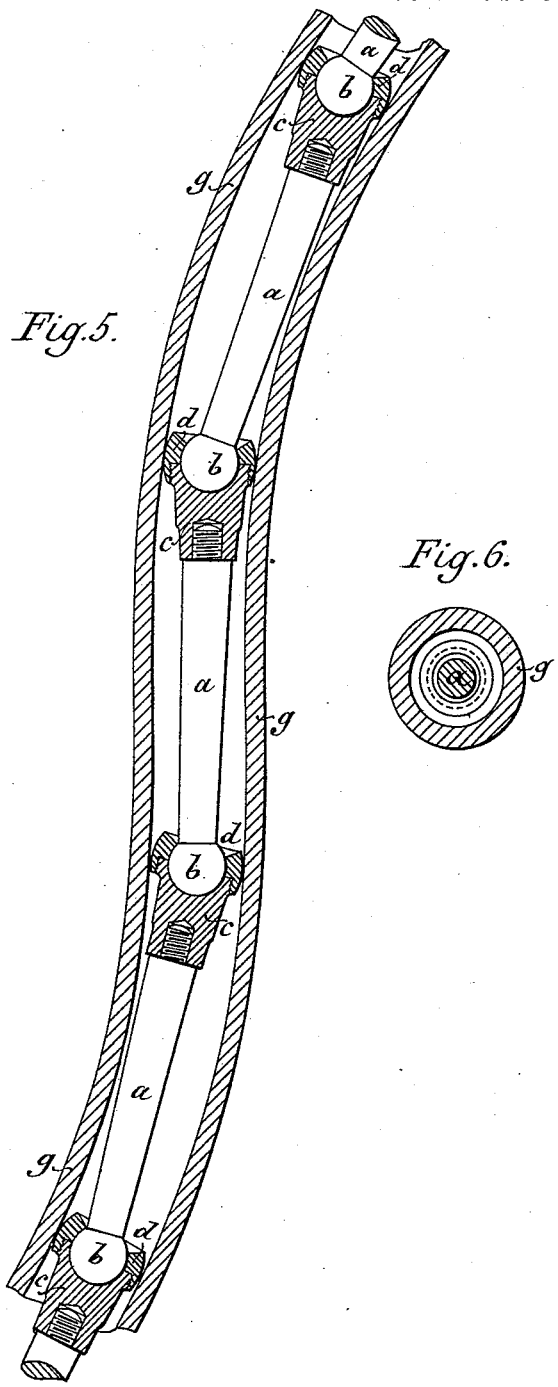
Figure 6:
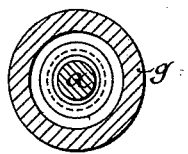

In the accompanying drawings, Figures 1 and 2 are a longitudinal and cross section, respectively, of part of the apparatus. Figs. 3 and 4 are respectively an elevation and a plan of the apparatus on a smaller scale. Figs. 5 and 6 are respectively a longitudinal and cross section of a modified form.

The links of the chain or flexible rod consist of short rods $a$, formed at one end with a ball $b$, while the other end is screwed into or otherwise suitably fixed to heads $c$, formed with a socket for the ball of the next link. The balls $b$ are retained in the sockets by means of screw-rings $d$, screwed into the heads and surrounding the balls. Each head $c$ is provided with a series of forked lateral projections $e$ for the reception of pins, on which are mounted rollers $f$, which bear against the inner walls of the tube $g$, in which the chain of flexible rod moves.

For the transmission of power from one point A to the other B the guide-tube $g$ is arranged in any desired or convenient manner between these points, and by pulling or pushing the end of the chain or flexible rod the whole of the tractive or pressure power is transmitted to the other point, minus the loss of the small rolling friction of the guide-rollers against the walls of the tube.

The guide-tube may be formed of any rigid material, such as metal, wood, or clay.

In some cases the guide-rollers $f$ may be omitted altogether, if desired. The sockets in which the balls are retained are then of partly spherical form and slide in the tube without any guide-rollers. This modified form is represented in Figs. 5 and 6. The same as in the above-described form, each of the links of the chain or flexible rod consists of a short rod $a$, formed at one end with a ball $b$, and with its other end screwed or otherwise fixed into a head $c$, which contains the socket for the ball of the next link. The balls are retained by means of screwed rings $d$, the outside of which is formed partly spherical and slides in the tube without any guide-rollers.

The dimensions of the different parts of the apparatus may be varied according to the power it is desired to transmit or other circumstances, as may also the number of the guide-rollers of each head and the diameter of the tube.

The above-described apparatus permits the transmission of the smallest power, as also that of the greatest, if the dimensions of the different parts are in accordance with the strain.

What I claim is—

1. The combination, with a rigid curved tube, of a series of links coupled together by ball-and-socket joints and guided by the walls of the tube, whereby power may be transmitted longitudinally through the tube in line with its axis, substantially as and for the purpose set forth.

2. The combination, with a rigid tube, of a series of links coupled together by ball-and-socket joints and provided with anti-friction rollers bearing against the walls of the tube, whereby said series of links is guided by the tube and is adapted for the transmission of power, substantially as for the purpose set forth.

In testimony whereof I affix my signature in presence of two witnesses.

OTTO KRELL.

Witnesses:
 HEINRICH SCHLENK,
 THEODOR VOLLAND.